United States Patent [19]

Lammers et al.

[11] 4,292,640

[45] Sep. 29, 1981

[54] CLOSED LOOP COMPENSATION OF INK JET AERODYNAMICS

[75] Inventors: Gerald B. Lammers, Boulder; Gregory L. Ream, Longmont, both of Colo.

[73] Assignee: International Business Machines Corporation, Armonk, N.Y.

[21] Appl. No.: 135,041

[22] Filed: Mar. 28, 1980

[51] Int. Cl.³ .............................................. G01D 15/18

[52] U.S. Cl. ........................................ 346/75; 346/1.1; 346/140 R

[58] Field of Search .......................... 346/1, 75, 140 IJ

[56] References Cited

U.S. PATENT DOCUMENTS

| | | | |
|---|---|---|---|
| 3,596,275 | 7/1971 | Sweet | 346/1 |
| 3,787,882 | 1/1974 | Fillmore et al. | 346/75 |
| 3,805,273 | 4/1974 | Brady et al. | 346/75 |
| 3,907,429 | 9/1975 | Kuhn et al. | 346/75 X |
| 4,045,770 | 8/1977 | Arnold et al. | 346/75 |
| 4,077,040 | 2/1978 | Hendriks | 346/75 |
| 4,097,872 | 6/1978 | Giordano et al. | 346/75 |

OTHER PUBLICATIONS

Giordano, F. P. et al., Deflection-Type Air Flow Sensor, IBM Technical Disclosure Bulletin, vol. 20, No. 2, Jul. 1977, p. 860.

Gebert, S. M., Ink Jet Drop Placement Compensation, IBM Technical Disclosure Bulletin, vol. 20, No. 3, Aug. 1977, pp. 912–913.

*Primary Examiner*—George H. Miller, Jr.

*Attorney, Agent, or Firm*—Joscelyn G. Cockburn

[57] ABSTRACT

A uniform velocity and/or time of flight profile across the jet streams of a multinozzle aspirated ink jet printer is maintained by a closed loop servo system. The servo system includes a drop charge sensor which senses the time of flight of charge droplets in the streams and generates a controlled signal. The signal is utilized by a controller means to generate controlled voltages. The voltages are used to adjust the velocity of a motor/-blower apparatus which supplies air to the aspirated ink jet printer.

22 Claims, 8 Drawing Figures

CLOSED LOOP COMPENSATION OF INK JET AERODYNAMICS

BACKGROUND OF THE INVENTION

1. Field of the Invention

The present invention relates to ink jet printers in general, and in particular, to aspirated ink jet printers wherein there is collinear flow between a stream of air and the ink droplets emanating from the printer head.

2. Prior Art

The use of ink jet printers for printing data and other information on a strip of recording media is well known in the prior art. One type of conventional ink jet printer incorporates a plurality of electrical components and fluidic components. The components coact to enable the printing function. The fluidic components include a print head having a chamber for storing a printing fluid or ink and a nozzle plate with one or more ink nozzles interconnected to the chamber. A gutter assembly is positioned downstream from the nozzle plate in the flight path of ink droplets. The gutter assembly catches ink droplets which are not needed for printing on the recording medium.

In order to create the ink droplets, a drop generator is associated with the print head. The drop generator vibrates the head at a frequency which forces thread-like streams of ink, which are initially ejected from the nozzles, to be broken up into a series of ink droplets at a point (called the break-off point) within the vicinity of the nozzle plate. A charge electrode is positioned along the flight path of the ink droplets. Preferably, the charge electrode is positioned at the break-off point of the ink drolets. The function of the charge electrode is to selectively charge the ink droplets as said droplets pass said electrodes. A pair of deflection plates is positioned downstream from the charge electrodes. The function of the deflection plates is to deflect a charged ink droplet either into the gutter or onto the recording media.

Another type of conventional ink jet printer incorporates a plurality of magnetic components and fluidic components. The fluidic components are substantially equivalent to the fluidic components previously described. However, the electrical components are replaced with magnetic components for influencing the direction of the streams. This type of ink jet printer is well known in the prior art and, therefore, the details will not be described.

One of the problems associated with ink jet printers of the aforementioned types is that of ink droplet misregistration at the recording surface. The ink droplet misregistration arises from interaction between the droplets as said droplets are propelled along a flight path towards the recording surface. The causes for droplets interaction are usually twofold: namely, the aerodynamic drag on the respective droplets and the electrical interaction between the electrical charges which are placed on the ink droplets.

The aerodynamic interaction and the electrical interaction are closely related. In fact, the aerodynamic interaction and the electrical interaction are complementary and are usually never observed independently. As ink droplets are generated at the nozzle plate, the charge electrode deposits a certain quantum of electrical charge on the droplets. Depending on the polarity of the charge, the droplets either repel or attract one another. The electrical forces which attract and/or repel the ink droplets tend to affect the relative spacing between the droplets. As such, some droplets arrive at the recording media early while others arrive late. In some situations, the droplets arrive at the recording media in groups rather than individual drops. The net result is that the copy quality is relatively poor due to droplet misplacement on the media.

The aerodynamic interaction also tends to affect the relative spacing between droplets. Spacing is affected because the aerodynamic interaction either increases or decreases the velocity of the droplets. As a result, some ink droplets are reaching the media early while others are reaching the media late. The overall effect is that the presence of the aerodynamic interaction also called the aerodynamic drag, aggravates or magnifies the effect of the charge interaction.

The aerodynamic interaction, sometimes called the aerodynamic drag, also creates a nonuniform velocity in the streams emanating from a multinozzle head. Consequently, the velocity variation from stream to stream results in inaccurate placement of the ink droplet and poor print quality.

In order to effectively solve droplet registration problems, both the charge interaction and the aerodynamic interaction have to be addressed. The prior art uses the so-called guard drop method to solve the charge interaction problem. In this method nonadjcent droplets are charged. Stated another way, charged droplets are separated by a predetermined number of noncharged droplets.

In addressing the aerodynamic interaction problem, the prior art utilizes a gas stream, such as air, to compensate for the aerodynamic drag on the ink droplets. U.S. Pat. No. 3,596,275 is an example of the prior art method. In that patent a stream of air is introduced into the droplet flight path. The air flows collinearly, with the stream of ink droplets and reduces the aerodynamic effect. In order to maintain laminar air flow, beginning at the point where the droplets are interjected into the air stream or vice versa, the nozzle is mounted in the center of the air stream. The charging electrode is fabricated in the shape of a hollow streamline strut. The strut is fitted with an opening through which ink droplets are ejected. The strut surrounds the nozzle with its opening and streamline contour position in the direction of air flow.

U.S. Pat. No. 4,097,872 is another prior art example of an aspirator where a fluid such as air is used to correct for aerodynamic interaction or aerodynamic drag. The aspirator includes a housing having a tunnel therein. The tunnel is spaced from an ink jet nozzle which emits an ink stream which passes through the tunnel. The tunnel is characterized by a circular geometry with a settling chamber section and a flow section. Air turbulence is removed at the settling chamber. Although the use of air into the ink droplets' flight path to correct for aerodynamic drag on the droplets is a step in the right direction, the prior art ink jet printers occasionally reproduce poor quality prints. The cause for the poor quality prints stems from the inaccurate placement of ink droplets on the reproducing media. The inaccurate drop placement is due to a nonuniform velocity profile between the streams of the printer.

U.S. Pat. No. 4,045,770 describes an apparatus for adjusting the velocity between the droplets of a single nozzle magnetic ink jet printer system. In the system, a coarse control loop servo and a fine control loop servo makes coarse and fine incremental adjustments, respectively, to a pump which supplies ink under pressure to the single nozzle. The direction of a velocity error signal associated with the drops are measured by a pair of drop sensors positioned relative to the droplets' flight path. The drop sensors are separated by a spacing of one drop wave length apart at a fixed distance from the drop generation point. The error signal is used to activate control circuits associated with the coarse and fine control loop servos.

U.S. Pat. No. 3,787,882 describes another sero system for controlling the velocity of ink jet streams. In the patent, the temperature and/or pressure of the ink is sensed at the pump and appropriate adjustments are made to the pump driving circuit to increase or decrease pump pressure and thereby increase or decrease velocity of the stream. The patent further contemplates the sensing of stream velocity and generating an error signal which is used to activate the pump driving circuit.

SUMMARY OF THE INVENTION

It is therefore the main object of the present invention to control the velocity of ink droplets in a single stream and/or between streams of a multistream print heat in a more efficient and effective way than was heretofore possible.

The present invention contemplates the use of a controller, a drop charge sensor and an airflow generator operably coupled to continuously monitor the print fluid streams and to provide an optimum airflow whereby a uniform velocity profile between streams or within a single stream is maintained.

More particularly, a controller is coupled to a motor/blower device. The motor/blower device supplies a laminar flow of air which flows collinearly with one or more print fluid streams generated from a print head. The motor/blower device includes a variable speed motor. By varying the voltage and/or current drive to the motor, the volume and/or velocity of air flowing from the motor/blower device also varies thereby increasing or decreasing velocity of the print fluid streams. The variable voltage is generated from a "control word" outputted from the controller. A drop charge sensor positioned relative to the streams generates enabling signals which are correlated by the controller to generate the control words.

The invention further contemplates to methods in measuring certain characteristics associated with the streams to determine the optimum airflow requirement.

In one method the flight time of all print fluid streams or jets within a multinozzle head are measured and recorded. Each stream is measured separately. The airflow velocity is increased via the controller until end streams and center streams have a uniform time of flight and/or velocity profile.

In another method the flight time of one or more charged drops in a single undeflected stream (or several noninteractive streams) is measured and recorded. The deflection voltage is next activated to provide partial deflection, and flight time is again measured. The differential time delay represents the differential aerodynamic drag experienced by the drops. Airflow is adjusted until the two flight times fall within a predetermined nominal value.

The foregoing and other objects, features and advantages of the invention will be apparent from the following more particular description of the preferred embodiment of the invention, as illustrated in the accompanying drawings.

DETAILED DESCRIPTION OF THE PREFERRED EMBODIMENT

The term aspirated ink jet print system as is used hereinafter means an ink jet printing system wherein a fluid such as air is ejected to flow with the fluid streams emanating from the print head.

The invention described hereinafter finds use with any fluidic systems wherein a plurality of stream droplets are generated and a constant velocity profile must be maintained between the droplets in multiple streams or in a single stream. Since the invention lends itself well in an ink jet printing system, the invention will be described in such an environment. However, such an association should not be construed as a limitation on the scope of the invention.

Figure 1:
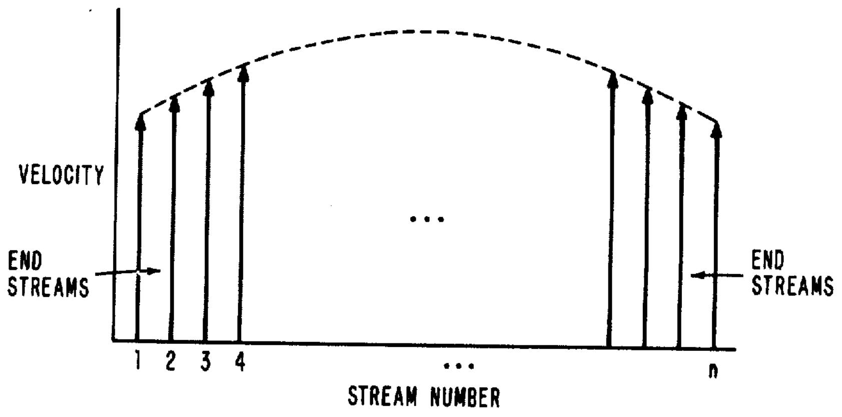
FIG. 1 shows a schematic of a nonuniform velocity profile across the streams of a multinozzle ink jet print head. The schematic is helpful in understanding the problem which the invention will correct.

Turning now to the drawings, and in particular to FIG. 1, a velocity profile of the multistreams emanating from a multinozzle ink jet printer head is shown. The figure is helpful in understanding the problem which this invention solves. The abscissa of the figure represents stream numbers extending from zero through N while the ordinate represents velocity. As is evident from the figure, the velocity of the streams are nonuniform. As such, the envelope generated by joining the extremities of each velocity vector is parabolic. Generally, the end strems have a smaller velocity vector than the middle streams. In relationship with a multinozzle ink jet printer, this means that the velocity of droplets in the end streams is slower than the velocity of droplets in the central streams. As was stated previously, nonuniformity in stream velocities results in misregistration at the recording surface (not shown) and hence, poor print quality. The invention to be described hereinafter will correct this problem by injecting a variable flow of air into the ink streams and forcing the end streams to travel at a velocity substantially equivalent to the central streams. The net result is that the envelope which joins the velocity vectors wil no longer be parabolic in shape but a relatively straight line running parallel to the abscissa of the drawing in FIG. 1.

It is worthwhile noting that the velocity shown in FIG. 1 is derived from the following expression.

$$V=D/T_f$$

where:

D=distance travelled by an ink droplet from point of break-off to some test point downstream therefrom.

$T_f$=time of flight of said ink droplets from break-off point to the test point.

Instead of using velocity of FIG. 1 to explain the problem associated with a multinozzle ink jet printer, the problem could have been explained with time of flight (TOF) vectors. Generally, the time of flight for the end streams is longer than the time of flight for the center streams. As such, the envelope (not shown) for the time of flight representation is a concave curve.

Figure 2:
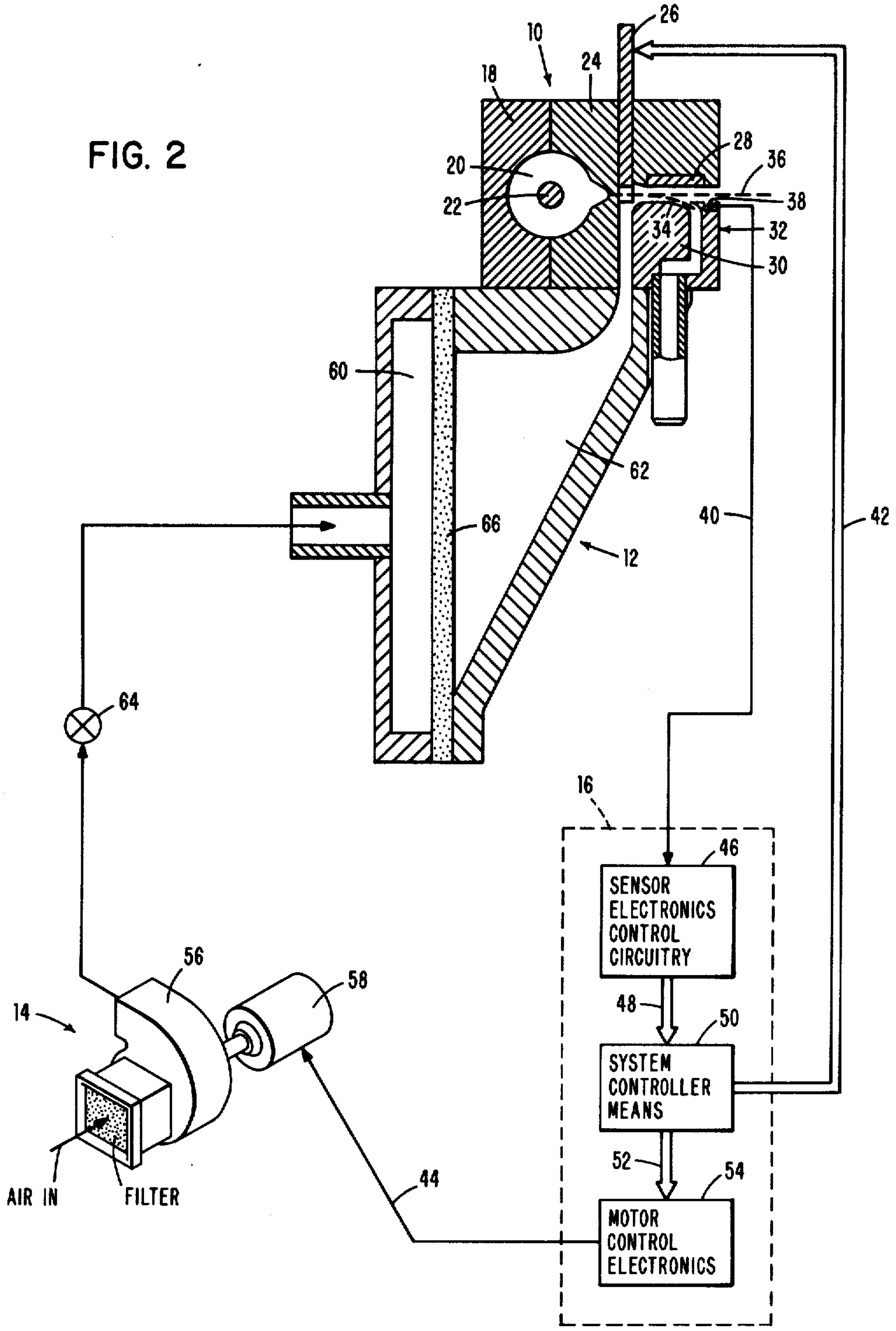
FIG. 2 shows a schematic of an ink jet printing system with an airflow generator and a servo-controlled loop according to the teachings of the present invention.

Referring now to FIG. 2, a schematic of an ink jet printing system embodying the teachings of the present invention is shown. The ink jet printing system includes a print heat assembly 10, an air tunnel assembly 12 coupled to the print head assembly, an air generating means 14 for supplying air to the tunnel assembly and a controller means 16 for controlling the system. The enumerated components of the ink jet printing system coact to generate a plurality of streams of ink droplets for printing indicia on a recording media (not shown).

Still referring to FIG. 2, the print head assembly 10 includes a head body 18. The head body may be of any desired geometry such as rectangular, circular, etc. The head body 18 is fitted with a fluid cavity 20. A print fluid such as an electrically conductive ink is placed within the fluid cavity 20. A crystal 22 is positioned in the fluid cavity. By applying a suitable electrical signal to the crystal, one or more thread-like streams of conductive fluid is ejected through minute holes fabricated in nozzle wafer or plate 24. The minute holes in nozzle wafer 24 are interconnected through minute passages to the fluid cavity 20. It should be noted that although the drawing in FIG. 2 shows only a single stream, the invention also contemplates a system having a plurality of streams. In such a system, the individual streams are arranged in spaced relation along a line extending perpendicular to the page.

Still referring to FIG. 2, downstream from the nozzle wafer a charge electrode assembly 26 is positioned relative to the streams. The charge electrode assembly 26 includes a plurality of individual charge electrodes. The function of the charge electrode assembly 26 is to charge or not charge individual streams ejected from nozzle wafer 24. Positioned downstream from the charge electrode assembly is the deflection electrode means. The deflection electrode means includes a high voltage plate 28 and a ground plate 30. Positioned downstream from the charge electrode is the gutter assembly 32. The function of the gutter assembly is to catch drops of ink not needed for printing on the recording media (not shown). As thread-like streams of ink are ejected from the minute openings in the nozzle wafer, they are broken up into individual droplets within the vicinity of the charge electrode assembly. Some of the droplets are deflected along no-print flight path 34 into the gutter, while others are probelled along flight path 36 for printing.

Still referring to FIG. 2, a sensor means 38 is mounted within gutter assembly 32. The function of the sensor is to generate a current signal wave form when charge droplets pass within its vicinity. As will be described subsequently, the current signal is utilized by controller means 16 to determine the charging phase for the streams and for measuring the time of flight (TOF) or for measuring the transit time of stream droplets from break-off at charge electrode assembly 26 until the droplets are sensed by sensor mean 38. The time of flight signal is used to calculate droplets' velocity and to control the air generating means 14 which supplies air to air tunnel assembly 12. The sensor means 38 is mounted within gutter assembly 32 so that it is partially shielded from ink by the gutter. However, portions of the sensor means are exposed so that as the charge droplets pass over the sensor means, the current signal is generated inductively. The sensor means is positioned to run in a direction traversely to the direction of travel of stream droplets. Stated another way, the sensor means is positioned perpendicular to the direction of travel of the stream droplets. Although a plurality of sensing means may be used, in the preferred embodiment of this invention, the sensor means is an inductive wire. A more detailed description of an inductive sensor which may be used in this invention is described in U.S. Pat. No. 3,977,010.

The signal outputted from the wire sensor is fed over conductor 40 into control means 16. The function of control means 16 is to generate control signals for driving motor/blower assembly 14 and to generate individual voltages for selectively charging droplets outputted from nozzle plate 24.

The individual voltages are supplied to the charge electrode assembly 26 over multiplexer bus 42. Likewise, the control signals for driving air generating means 14 are supplied over conductor 44. The controller means 16 includes sensor electronics control circuitry 46. The sensor electronics circuitry 46 utilizes the current signal on conductor 40 to generate a time of flight signal and the amplitude of the current signal and transfers both signals over multiplexer bus 48 into system controller means 50. Although system controller means 50 may be generated from discrete logic and/or circuit components, in the preferred embodiment of this invention, system controller means 50 is a conventional microprocessor. The detailed operation for sensor electronics control circuitry 46 and system controller means 50 will be described subsequently. Suffice it to say at this point that the system controller means 50 generates the individual voltages used by charge electrode assembly 26 for charging the individual stream droplets. The voltage signals are supplied over multiplexor bus 42. The system controller means 50 also supplies a control word over multiplexed bus 52. The control word is transmitted to motor control electronics 54 where it is converted into an appropriate voltage level for adjusting the air generating capabilities of air generating means 14.

The air generating means 14 includes a conventional blower 56 coupled to a conventional multispeed motor 58. By changing the voltage and/or current driving motor 58, the velocity and amount of air emanating from the blower can be increased or decreased. As was stated previously, the change in air velocity results in adjusting the velocity profile across the streams emanating from the print head assembly. The air generated by air generating means 14 is fed into air tunnel assembly 12. The air tunnel assembly includes a plenum section 60 and a tunnel section 62. The plenum section functions as a settling tank to remove turbulence from the air. Air into the plenum section is controlled by valve means 64. The valve 64 is conventional, and therefore, details will not be given. The partially settled air is fed through screen filter means 66 where the remaining turbulence is removed. The tunnel section 62 extends from the screen filter means 66 or the plenum section 60 throughout the length of print head assembly 10. The tunnel section is such that settled air escaping from the plenum section 60 through the screen filtering means 66 travels through the tunnel to flow collinearly with the streams ejecting from the multinozzle print head assembly.

Figure 3:
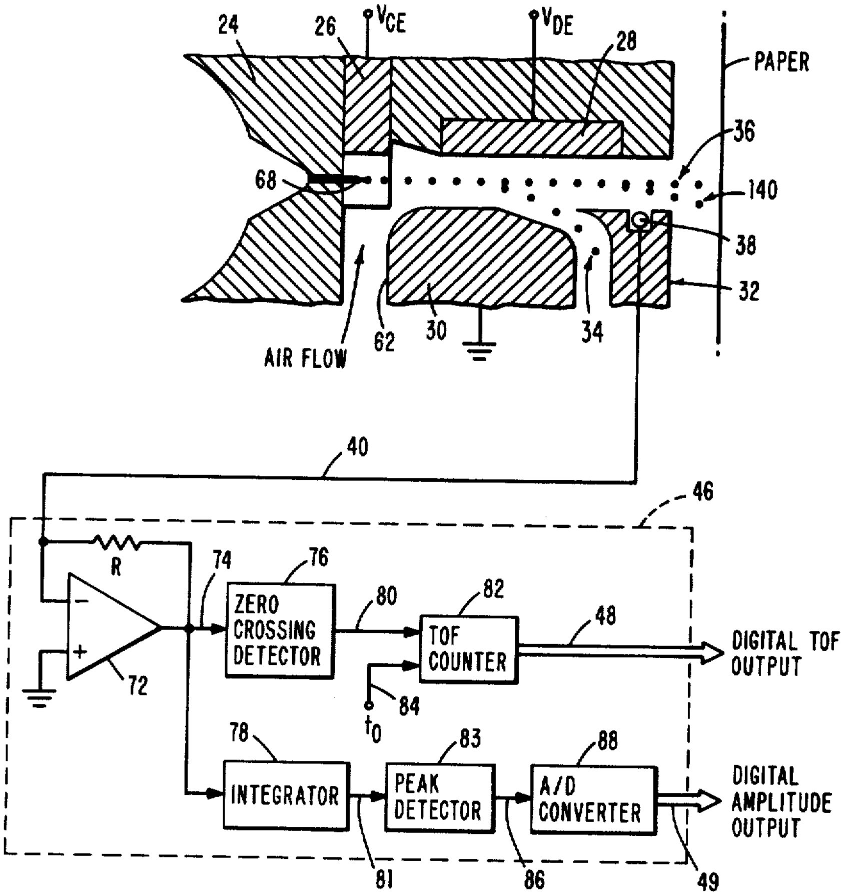
FIG. 3 is a schematic showing an aspirated head configuration with a drop charge sensor and associated electronics.
Figure 8:
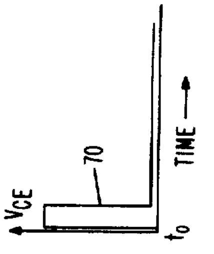
FIG. 8 is a graphical representation of the $V_{CE}$ which is applied to the charge electrode.

Turning now to FIG. 3, the detailed circuit configuration for sensor electronics control circuitry 46 is shown. Components in FIG. 3 which are identical to components previously described in FIG. 2 will be identified with common numerals. Components having common identity and function will not be described hereinafter, since they have already been described in FIG. 2. As was stated previously, printing fluid emanating from nozzle plate 24 is first ejected as a thread-like continuous stream of fluid 68. The showing in FIG. 3 is an exaggerated representation of the stream size. In reality the streams are much smaller. Ideally the streams are equivalent in size to a fine piece of thread or a human hair. At some point downstream from the nozzle plate 24, individual drops are broken off or separated from the continuous stream. The point at which break-off occurs is dependent on the drop frequency ($f_d$) and amplitude of the signal which is driving the crystal. The charge electrode assembly 26 is positioned at the point where break-off occurs, hereinafter called the break-off point. As a drop is separated from the stream, a voltage $V_{CE}$ is supplied to the charge electrode 26 for charging the individual drop. It should be noted that charge electrode assembly 26 includes a plurality of individual charge electrodes. The number of charge electrodes is dependent on the number of streams in the multinozzle head. As such, each drop in each stream can be charged individually. The voltages $V_{CE}$ which charge the individual drops are generated by the system controller means 50 (FIG. 2). Turning for the moment to FIG. 8, a graphic representation of the drop charging voltage $V_{CE}$ is shown. The phasing between the charging voltage envelope 70 and a detached drop is such that the drop is centered within the envelope. As such, each drop is supplied with an optimum magnitude of electrical charge. The time ($t_o$) is the time when system controller means 50 generates the charging voltage 70 for charging the drop. As will be shown hereinafter, this time ($t_o$) is necessary to calculate the time in flight for a droplet or group of droplets from break-off point until it is sensed downstream by the sensor 38. A constant voltage $V_{DE}$ is applied to deflection electrode 28 to deflect drops not needed for printing on the paper along no-print path 36 into the gutter. Drops needed for printing are propelled along print path 34 to imprint indicia on the paper.

Figure 7:
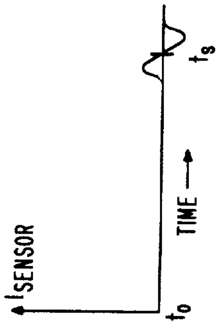
FIG. 7 is a graphical representation of a current waveform. The current waveform is generated by a charge droplet passing within the vicinity of the drop charge sensor.

Returning now to FIG. 3, as a charged droplet or series of droplets pass over sensor 38, a current is induced in the sensor. Turning to FIG. 7 for the moment, a graphic representation of the induced current is shown. The current is substantially sinusoidal in shape and is sensed sometime following $t_o$. It should be noted that $t_o$ shown in FIG. 7 is identical to the $t_o$ shown in FIG. 8. With respect to FIGS. 8 and 7, at $t_o$ a voltage is applied to the charge electrode by system controller means 50. At sometime later, $t_s$, a current is sensed in sensor 38. The time elapsing between $t_o$ and $t_s$ is the time required for a drop to travel from the point of break-off until it is sensed. Referring back to FIG. 3, the sensed current is conducted through conductor 40 to a conventional current amplifier 72. The current amplifier 72 includes a feed-back loop with a gain adjustment resistor R positioned in said loop. The sensed current is amplified and is supplied over conductor 74 to a zero-crossing detector 76 and an integrator 78 simultaneously. The function of zero-crossing detector 76 determines when no current is induced in the sensor 38. At this instant of time, the charged droplet is positioned directly over the sensor 38. With reference to FIG. 7, $t_s$ is the point in time when the sinusoidal current wave form is crossing the time abscissa. Turning back to FIG. 3, a control pulse is outputted on conductor 80 at the instant of time ($t_s$) when no current is sensed by zero-crossing detector 76. Conductor 80 couples the output from zero-crossing detector 76 to the input of counting means 82. In the preferred embodiment of this invention, counting means 82 is a conventional counter hereinafter called time of flight (TOF) counter 82. Another control signal $t_o$ is fed over conductor 84 into TOF counter 82. In operation, as soon as system controller means initiates a charging pulse 70 (FIG. 8) for charging a particular drop breaking off from stream 68, a control signal is outputted on conductor 84 to TOF counter 82. This signal begins or enables the counter to count. The counter continuous to count until a controlled pulse is outputted on terminal 80. This pulse indicates that the charge drop is positioned directly above sensor 38. The counter is then disabled and the trapped count represents the time elapsing between break-off and sensing of the drop. This count is outputted on multiplexor bus 48 as the digital TOF output. As was stated previously, simultaneously with transferring the sense current into zero-crossing detector 76, the sense current is fed into integrator 78. The integrator 78 is a conventional device and its details will not be given. After integration of the current wave form by integrator 78, a signal is outputted on conductor 81. The peak of the integrated current wave form is detected by peak detector 83. The peak signal is outputted on conductor 86. The signal on conductor 86 is then digitized by A/D (analog-to-digital) converter 88. The digitized signal is then outputted as a digital amplitude output on multiplexer bus 49. As will be described hereinafter, the digitized signals on multiplexor bus 49 are utilized by system controller means 50 (FIG. 2) to charge phase the droplet. Similarly, the TOF signals on multiplexor bus 48 are used to control the velocity of the streams.

Figure 4:
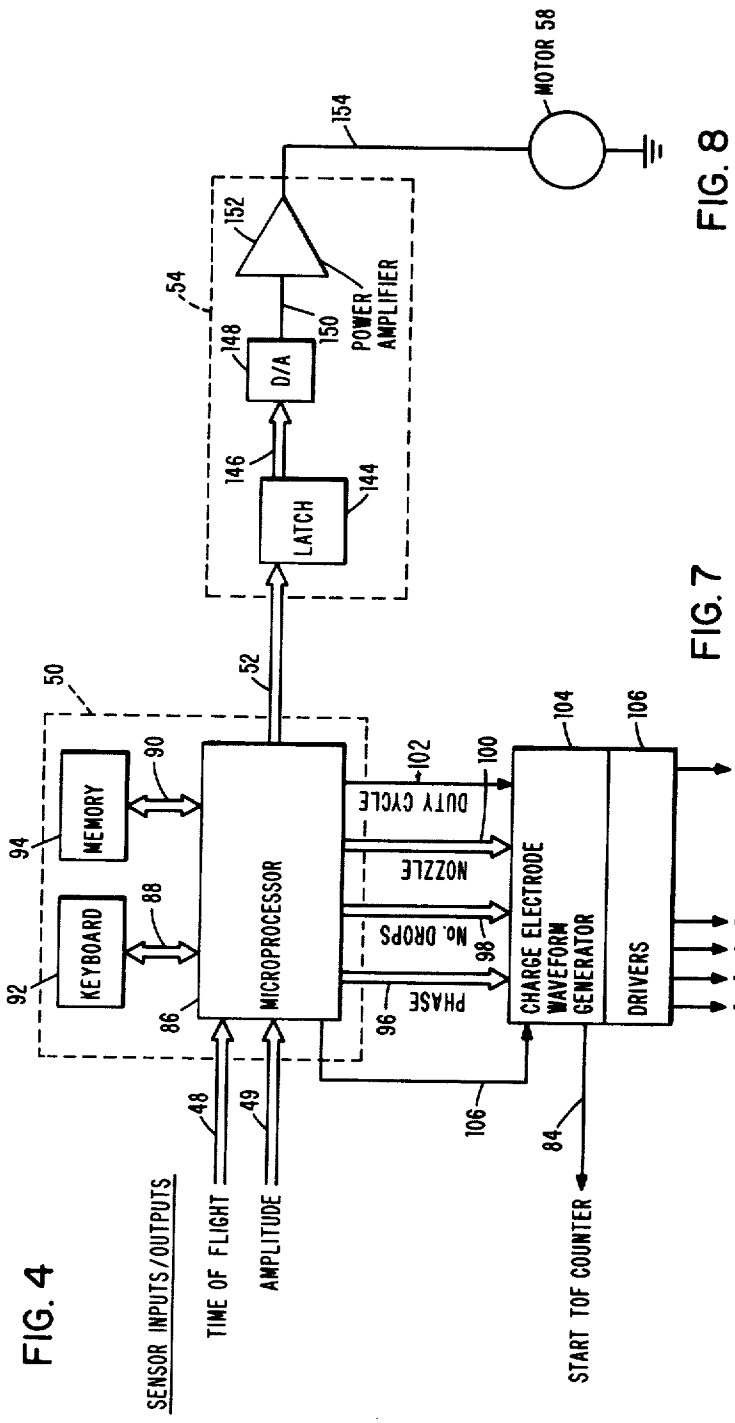
FIG. 4 shows a system block diagram of the controller and associated electronics which generate a variable voltage for driving the airflow generator.

Referring now to FIG. 4, a block diagram for the details of system controller means 50 and motor control electronics 54 are shown. As was stated previously, the system controller means 50 may be generated from discrete logic circuit blocks. However, in the preferred embodiment of this invention, the system controller means 50 is a conventional microcomputer. Any type of conventional microcomputers can be used. By way of example, the M6800 microcomputer manufactured by Motorola Semiconductor Inc. is a suitable microcomputer. This microcomputer has its given instruction set which can be utilized by one having ordinary skill in the art of programming to generate a machine program in accordance with the process steps to be given hereinafter. The microcomputer includes a microprocessor module 86 coupled through bidirectional multiplexor buses 88 and 90 to keyboard 92 and memory 94 respectively. Generally the microprocessor is used to perform mathematical calculations and for making logical decisions. Data and instruction sets needed for calculating purposes are retrieved from the memory over multiplexor bus 90. Likewise, an operator may enter data into the the microcomputer through keyboard 92. A primary function of microcomputer 50 is to determine the phase relationship between the signal driving the crystal and the pulse signal which is used by the charge electrode generator 104 for charging a droplet at break-off point. As is well known in the art, the phase of the crystal drive pulse determines the point at which a droplet is separated from the thread-like stream emanating from the nozzle plate. The procedure by which the relationship between the crystal drive signal and the droplet charge signal is determined is often referred to as charge phasing. Since charge phasing is well known in the art, a complete description will not be given in describing this invention. A detailed description of phasing is given in the IBM® Technical Disclosure Bulletin, Vol. 22, No. 7, December 1979, page 2666. It should be noted at this point that the charge phasing procedure and all other procedures to be described hereinafter are done on a single stream of the multinozzle head by the microcomputer. Briefly stated, the phasing routine may be described as follows. The delfection electrode signal $V_{DE}$ which is applied to the deflection plates 28 (FIGS. 1 and 2) is turned off. The microcomputer then generates and applies a control signal (not shown) to the crystal driver. This control signal provides crystal drive to the crystal 22 (FIG. 2), such that ink droplets will break off from the thread-like stream at a point downstream from the nozzle plate. The microcomputer then provides a partial duty cycle pulse to the charge electrode of the selected stream. Typically, the charge electrode pulse is one-eighth the period of the drop period. The initial one-eighth period pulse is selected to have phase 0 (occurring at the beginning of the drop period with respect to the crystal drive waveform). Sixteen different phases (phase 0 to phase 15) are used during the phasing cycle. Any number of phases (M) might be selected, but the phases should be such that the width of the charge electrode pulse overlaps more than one phase. When break-off occurs while a voltage is applied to the charge electrode, sensor 38 senses the current and generates time of flight signal and amplitude signal over multiplexor bus 48 and 49 respectively, to the microcomputer. This amplitude information in combination with the partial duty cycle charge electrode pulse, is used to identify the exact point at which a droplet is breaking off from the thread-like stream.

Once the phase at which break-off is occurring is determined by the partial duty cycle, the charging phase is set eight phases from break-off phase. By way of example, assuming that phase three in the partial duty cycle was the phase at which droplet is breaking off, then the charging phase would be set eight phases from break-off phase which would be phase 11. Once the phase is determined, the charging signal is applied to the charge electrode at full duty cycle for printing or time of flight measurements.

Referring now to FIG. 4, the microcomputer knows the phase at which the droplets are breaking off. The microcomputer, therefore, outputs the phase at which break-off is occurring on multiplexer bus 96. The phase can be one of M assuming that M is the total number of phases. The microprocessor also outputs the number of drops to be charged in a particular stream on multiplexor bus 98. Any number of drops may be selected from 1 through k, where k is the maximum number of drops to be charged. Likewise, any number of nozzles within the group of nozzles of the print head can be selected by the microprocessor and is outputted on multiplexer bus 100. Also, the duty cycle of the pulse to be used is outputted on simplex bus 102. The duty cycle may be full (100%) or partial. The just-mentioned controlled signals are fed into charge electrode (CE) wave form generator 104. The charging signals for the streams in the multinozzle head are driven by drivers 106 over conductors 0 through N to the charge electrode associated with a particular stream. In FIG. 4, N represents the maximum number of charge electrodes positioned in charge electrode assembly 26 (FIG. 2). Of course, the number of charge electrodes are equal to the number of streams in the multinozzle head. The operation of the charge electrode wave form generator is enabled/disabled by a controlled signal outputted from microcomputer 50 on conductor 106. Likewise, the enabling pulse $t_0$ which initiates counting in the TOF counter 82 is outputted by charge electrode wave form generator 104 on conductor 84.

In order to maintain a uniform velocity profile or time of flight profile across the multijets or within the droplets of a single jet, the microprocessor performs the following routine. A broad description of the process steps are given followed by a detailed description.

STEP 1

The microprocessor first selects one of the end streams within the multistreams.

STEP 2

One or more drops in the selected streams are charged by the charge electrode wave form generator 104 under the control of the microprocessor. Simultaneously, with charging the drops, the time of flight counter 82 is set. When the charge drops or drop pass over the sensor, the counter is stopped. A control signal indicative of the time of flight is outputted on multiplexor bus 48 (FIG. 4) and is stored in the microcomputer. If it is desired to use more than one end stream, a similar process is performed and the information stored within the microcomputer. An average time of flight value will be calculated by the microcomputer and stored therein.

STEP 3

In a similar fashion as that described under STEP 2, one or more central streams in the array is selected and the time of flight is calculated, averaged and stored in the microcomputer.

STEP 4

The microcomputer then takes the algebraic difference between the time of flight for the end streams and the time of flight for the central streams.

STEP 5

The difference is then compared with a predetermined standard. If the difference falls within the range of the standard, then no adjustment is made. However, if the difference is outside of the range and is positive, this indicates that the time of flight for the end stream is longer than the type of time of flight for the central streams. As such, the voltage of the blower motor is adjusted to increase the velocity of air in the flow tunnel. Likewise, if the difference is negative, this inciates that that the time of flight of the end streams is shorter than the time of flight of the central streams. As such, the voltage of the blower motor is lowered to reduce the velocity of air ejected into the tunnel.

Figure 5:
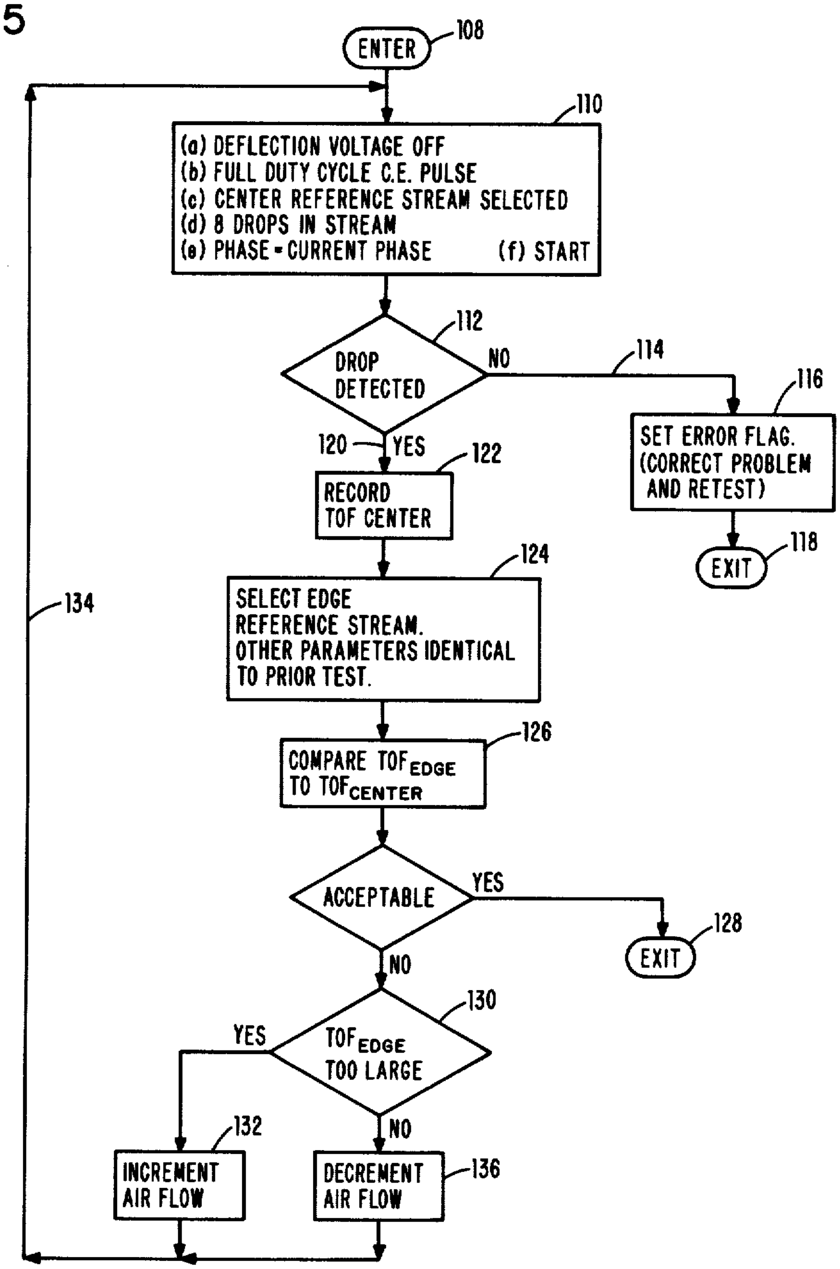
FIG. 5 shows a flowchart of a routine or a series of process steps for determining time of flight (TOF) for the streams in a multistream ink jet system.

Turning now to FIG. 5 is a flowchart showing the so-called edge and center stream time of flight comparison method. This flowchart gives a more detailed description of the process steps of the routine or the procedure necessary to determine the time of flight (TOF) diffference between end streams and center streams of a multinozzle head. With the showing of the flowchart, programming the microcomputer to perform the necessary routine is within the skill of the art. The first block in the routine is the so-called enter block 108. This block forces the microcomputer to enter the routine. Drop charge sensing (DCS) block 110 can initiate DCS cycle on a selected stream. Such a cycle is initiated as follows:

(a) ascertaining that the deflection voltage is off.

(b) generating a full duty cycle charge electrode (CE) pulse.

(c) select one of the streams in the multinozzle configuration. For example, a center stream may be selected.

(d) select a number of drops to be charge within the selected stream. By way of example, eight drops may be selected.

(e) Next the phase which is equal to the current charging phase is selected.

(f) a start signal is then issued to the CE generator 104 (FIG. 4). The next block in order is the so-called decision block 112. If a drop is not detected, the block is exited along path 114 into an error block 116. This means that the sensor positioned downstream from the charge drops did not sense passage of a charge drop and therefore an error flag is set and the program exits the procedure at exit block 118. If the sensor did sense passage of a charge drop, the program exits decision block 112 along path 120 to block 122. In block 122 the time of flight (TOF) for the stream (such as a center stream) selected is stored. The program next proceeds to block 124. In block 124 the program will now select an edge stream and perform all the tests enumerated above with respect to DCS block 110. The program then exits block 124 into block 126. The program then compares time of flight (TOF) for the edge stream with the time of flight (TOF) for the center stream. If the difference is within a predetermined acceptable range, the program exits the yes path to exit block 128. However, if the difference falls without the acceptable range, the program moves into decision block 130. The program then tests to see if the time of flight for the edge stream is too large; if so, the program moves into block 132 to increment airflow to the air tunnel assembly. The program then moves along path 134 to perform the above-described tests. However, if the time of flight error signal in block 130 is too small, then the program moves into block 136 to decrement the air flow to the air tunnel assembly. The process is continued until the difference between a single edge stream when compared with a single center stream (or a group of edge streams calculated individually and averaged when compared with a group of center streams calculated separately and averaged) falls within the allowable range.

Another routine or method which may be used to determine the time of flight error signal is the so-called deflected/undeflected drop time of flight comparison method. This method measures the time of flight error associated with drops in a single stream. With particular reference to FIG. 3, in this method droplets are allowed to travel along an undeflected path such as path 36. In a manner similar to that previously described, the time of flight for such drops are measured and recorded. The drops are next deflected along a deflection flight path such as 140. The time of flight for the deflected drops is next calculated. The difference in flight time between the deflected and nondeflected drops is the time of flight error which is used for changing the voltage to the blower motor.

Figure 6:
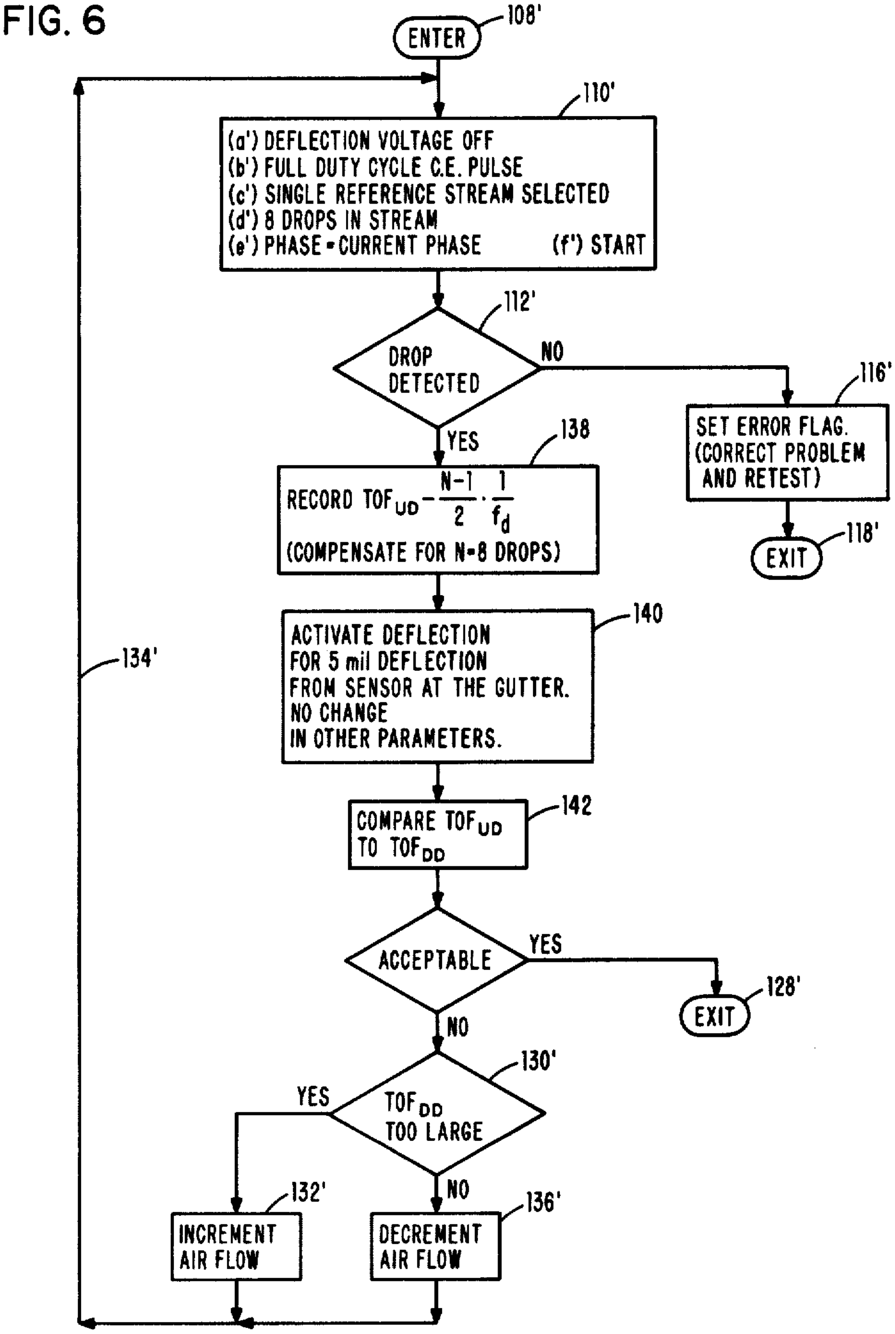
FIG. 6 shows a flowchart of a routine or a series of process steps for determining the time of flight (TOF) for ink droplets of a single stream. Any variation in the TOF data is used to adjust the drive voltage of the air generator.

Referring now to FIG. 6, a flowchart of the program steps needed to practice the deflected/undeflected drop TOF comparison method is disclosed. In FIG. 6 process blocks which are performing identical functions as process blocks previously described in accordance with FIG. 5 will be identified with the same numeral or numbers plus an upperscript notation ('). By way of example, enter block 108 (FIG. 5) is Enter block 108' (FIG. 6). However, since these blocks are performing the same function as the previously described block, a description will not be repeated. The program enters a routine in entry block 108'. Then into the drop charge sense cycle, block 110' where steps (a') through (f') are performed. Next in order, the program enters blocks 112', 116' and 118'. As the program enters a respective block, the process step required in that block is performed in a manner similar to that described in accordance with FIG. 5. If the program exits block 112' along the yes path, it next enters compensated block 138. The function of the compensation block 138 is to adjust the value recorded for the time of flight of an undeflected drop by a compensation factor. The compensated time of flight is determined from the following expression:

$$\text{Compensated } TOF = \text{Recorded } TOF \text{ (undeflected drop)} - \frac{(N-1)}{2} \cdot \frac{1}{fd}$$

where:

N is the number of drops selected in the stream fd is the drop frequency of the signal used for driving the crystal The program next enters deflected drop charge sense cycle block 140. Taken in descending order as listed in the block in the drawing, the program activates the deflection electrode so that the drops are deflected approximately five mils with respect to the sensor. As was stated previously, the sensor is a wire positioned downstream from break-off point preferably shielded by the gutter (see FIG. 3). Steps (a') through (f') identified in block 110' above are performed. The value for the time of flight of the deflected drops are then stored. The program then enters block 142 where it compares the time of flight values for the undeflected drops with the time of flight values for the deflected drops. If the difference falls within an acceptable range, the microcomputer exits the program at exit block 128'. If the calculated difference in time of flight between the deflected and the undeflected drops are outside of some acceptable range, the program then enters decision block 130'. From 130' the machine either increments airflow or decrements airflow by way of block 132' or 136'. The routine is continued until the error between deflected and undeflected drops fall within the acceptable range.

Turning to FIG. 4 for the moment, once the microcomputer determines an unacceptable time of flight error, a code word is assembled and outputted on bus 52. A latch circuit 144 accepts the code word for storing. The contents of the latch is fed over conductor 146 and converted into a voltage by digital to analog converter 148. The output from the D/A converter is fed over conductor 150 into power amplifier 152. The output from the power amplifier is transmitted by conductor 154 to drive motor 58. The output from the motor is used to drive blower 56 which supplies air to the air tunnel assembly. By changing the control word outputted from the microcomputer, the voltage and/or current which power amplifier 152 applies to the motor can be increased or decreased. As a result, the velocity of the air generated by the motor blower combination can be increased or decreased thereby changing the character of the velocity profile across the streams. The motor blower drive signal is adjusted until a uniform velocity profile or time of flight profile is measured across the streams.

While the invention has been particularly shown and described with reference to preferred embodiment thereof, it will be understood by those skilled in the art that the foregoing description and/or drawings may be changed therein without departing from the spirit and scope of the present invention.

What is claimed is:

1. In an ink jet printing system wherein one or more continuous streams of ink are broken up into streams of individual droplets of ink and a trajectory characterizing means for channeling the droplets into a print flight path and a no-print flight path, the improvement comprising:

a first means for ejecting a laminar airflow into the flight path of the droplets;

a means approximately positioned in relation to the ink droplets, said means being operable to sense a velocity associated with the droplets and for developing a first control signal representative of said velocity; and a controller operable to receive the first control signal and to generate a second control signal, said second control signal being operable to energize the first means so that the velocity of the laminar airflow is adjusted.

2. The ink jet print system of claim 1 wherein the first means includes:

an airflow channel positioned so as to contain the streams and/or droplets;

a blower device operably coupled to the flow channel; and a variable speed motor coupled to said blower device.

3. The ink jet print system of claim 2 further including one or more air filters positioned within the flow channel, said air filters being operable to remove foreign particles from the airflow.

4. The ink jet printing system of claim 1 wherein the means for sensing the velocity associated with the droplets includes a charge drop sensor wire operable for selectively outputting a current waveform signal indicative of the passing of a charged droplet within the vicinity of said sensor; and circuit means for processing said current waveform signal to generate time of flight signal and amplitude signal therefrom.

5. The ink jet printing system of claim 4 wherein the controller includes a programmable microcomputer.

6. In a multinozzle ink jet printing system wherein a plurality of individual streams of ink droplets are generated to print characters on a recording medium, an apparatus for maintaining a uniform velocity profile across the streams comprising:

means for conveying a uniform flow of air to said streams;

air blower coupled to said conveying means and operable to deliver air thereto;

a variable speed motor coupled to said air blower;

means for sensing a velocity associated with said droplets and to generate a signal indicative of said velocity; and controller means to receive the signal and to control the motor to operate at an optimum speed so that the airflow propels the droplets in the streams at a relatively uniform velocity.

7. The ink jet printing system of claim 6 wherein the controller means includes:

a computer means operable to generate a voltage control word; and an electronic circuit means to receive the control word and to generate motor drive signals therefrom.

8. The ink jet printing system of claim 7 wherein the electronic circuit means includes:

an electronic latch operable to receive and store the control word;

a digital-to-analog converter coupled to the latch; and a power amplifier coupled to said converter.

9. A device for maintaining a uniform velocity profile across a multinozzle aspirated ink jet printing system comprising:

a variable speed motor/blower device for supplying air to said streams;

a means for sensing the velocity of said streams and to generate a signal indicative of said velocity; and a controller for accepting the signal and to adjust the speed of the motor/blower device.

10. An apparatus for maintaining a uniform velocity across the streams generated from a stream generating device, said apparatus comprising:

an air generating means operable situated to blow air collinearly with the streams;

a means for sensing a velocity associated with said streams and to generate a signal indicative of the sensed velocity; and means to accept the signal and to enable a change in the air generating means.

11. A method for controlling an ink jet printing system to maintain uniform stream velocity comprising of the following steps:

(a) supplying air flow to the stream;

(b) determining the point at which ink droplets separate from the stream;

(c) placing an electrical charge on the ink droplets;

(d) determining the time of flight for said droplets;

(e) generating an error signal indicative of nonuniform time of flight; and (f) adjusting airflow until time of flight is within an acceptable range.

12. The method of claim 11 wherein the point at which ink droplets separate is determined by phasing said stream.

13. The method of claim 11 wherein the time of flight is determined by the following steps:

(a) identifying a droplet break-off time (t0);

(b) identifying the time (ts) for the droplet to pass a sensed zone positioned downstream from the droplet break-off point; and (c) counting the time elapsed from t0 through ts.

14. The method of claim 11 wherein the error signal is the algebraic difference between droplets flight time measured at individual streams.

15. A closed loop control system for maintaining a uniform velocity profile across the fluid streams of a multinozzle print head comprising:

a print head for generating a plurality of droplet streams;

air generating means for supplying a laminar airflow to the drop streams;

means positioned relative to said streams and operable to influence the flight path of said droplets;

an inductive sensor means positioned downstream from said print and operable to generate control signals representative of the flight time of drops; and means for correlating the flight time signals and to generate motor control signals for driving the air generating means.

16. The system of claim 15 wherein the inductive sensor means is a wire.

17. An improved ink jet printing system comprising:

a print head having at least one print nozzle for ejecting at least one stream of printing fluid droplets therefrom;

air generating means positioned relative to said print head, said air generating means being operable to eject an air stream to flow with the droplet stream;

means for influencing the droplets for traveling along a print flight path and a no-print flight path;

fluid catching means positioned downstream from the print head and operable for catching droplets selectively;

sensor means positioned relative to the fluid catching means and operable to generate a first control signal;

circuit means operable to process the first control signal and to generate a time of flight (TOF) signal;

controller means for processing the TOF signal and to generate a second control signal; and means to receive the second control signal and to generate drive signals for the air generating means.

18. The ink jet printing system of claim 17 further including means coupled to the circuit means and operable to generate an amplitude signal from the first control signal.

19. The ink jet printing system of claim 18 wherein the means include:

an amplifier;

integrator means coupled to the amplifier and operable to integrate a signal outputted from said amplifier;

peak detector means coupled to the integrator means; and an analog-to-digital converting means coupled to the ink operating means.

20. The ink jet printing system of claim 17 wherein the circuit means includes:

an amplifier;

a zero-crossing electrical network coupled to the amplifier; and a counting means coupled to the zero-crossing electrical network.

21. The circuit means of claim 20 further including means to enable the operation of the counting means.

22. A method for dynamically controlling an aspirated ink jet printing system to maintain the streams in an optimum printing condition comprising the following steps:

charge phasing the droplets of a selected print stream;

measuring a velocity associated with said droplets and generating signal representative of said velocities;

processing the signal and generating an error signal indicative of a nonoptimum operating condition; and using the error signal to adjust an airflow, associated with the streams thereby correcting nonoptimum printing condition and bringing the streams within the optimum printing condition.

* * * * *